United States Patent [19]
Hicks

[11] 3,847,120
[45] Nov. 12, 1974

[54] BIRD TRAINING DEVICE

[76] Inventor: Wade E. Hicks, 4900 Shirley St., Alexandria, Va. 22309

[22] Filed: Feb. 23, 1973

[21] Appl. No.: 335,011

[52] U.S. Cl. .................................. 119/29, 119/26
[51] Int. Cl. ..................... A01k 15/00, A01k 31/12
[58] Field of Search .......................... 119/26, 29, 17

[56] References Cited
UNITED STATES PATENTS

| | | | |
|---|---|---|---|
| 56,407 | 7/1866 | Gunther | 119/17 |
| 122,138 | 12/1871 | Suppernio | 119/17 |
| 1,998,787 | 4/1935 | Nyhagen | 119/26 X |
| 2,445,419 | 7/1948 | Brown | 119/17 |
| 3,041,911 | 7/1962 | Marder | 119/26 X |

*Primary Examiner*—Hugh R. Chamblee
*Attorney, Agent, or Firm*—Lowe, King & Price

[57] ABSTRACT

A device for training a bird to talk including a sound recording playback unit mounted in a housing and with a pivotal perch operative to turn on the playback unit to play the spoken sounds when the bird alights on the perch. The housing has a mirror that is of sufficient size to reveal substantially a full size reflection and the speaker of the unit is mounted directly behind the mirror to encourage the bird on the perch to talk. Holding means are provided in the form of a strip means having notches to latch the perch operated switch in either the "on" or "off" position. The record means for the playback unit includes an endless band with guiding means positioned adjacent the outer periphery of the housing and the tape head of the unit and at least one of the guiding means are resiliently mounted by springs having different strengths.

7 Claims, 2 Drawing Figures

BIRD TRAINING DEVICE

The present invention relates to education or training of animals, and more particularly, to an improved device for training birds to talk.

BACKGROUND OF THE INVENTION

In recent years, the training of birds to talk has become a very popular hobby with people. It has been proven that the birds of the parrot family, parakeets, myna birds and the like are indeed very intelligent and can be trained to say almost anything. The proven method of teaching the bird to talk is to have someone repeat the same phrase over and over for a long period of time every day until the bird learns to repeat the phrase. It has also been found from studies that few birds ever reach the point where their full talking abilities have been developed and this is due mostly to the lack of perserverance of the owner. Furthermore, the bird must be reinforced with phrases that it has learned if the bird is to retain that particular phrase in its repertoire. A talented talking bird is highly entertaining if properly trained to mimic a number of words and phrases well, and not endlessly repeat one or two words which sometimes results from poor or improper training.

It has previously been suggested that birds could be induced to sing or imitate musical sounds from a music box that is operated by the weight of the bird on a perch, as shown in the U.S. Pat. to Marder, No. 3,041,911, issued July 3, 1962. However, as taught in the patent and as is obvious to me, this prior device functions primarily as a device to entertain the bird, and the device has little or no training attributes. The shortcoming as a training device lies in that the "plinking" sound of a music box is not suited to mimicking by a bird since most song birds, such as canaries, have a natural smooth and melodious tone to their voice. Accordingly, insofar as I am aware, the device utilizing a music box has not and cannot succeed as a training device. Furthermore, training of a bird to talk is more difficult, making it appear that a device of this type could not be used as a trainer, lest the teachings and inherent shortcoming of Marder be ignored. With this background, I set out to develop a novel device for this purpose of teaching a bird to talk.

OBJECTIVES OF THE INVENTION

Thus, it is one object of the present invention to provide a device for training birds to talk that includes a recording playback unit that repeats spoken sounds.

It is another object of the present invention to provide a device having a playback unit that particularly encourages the bird to learn to speak and is automatically operated when the bird is attracted by his full-size reflection in a mirror mounted on the device.

It is still another object of the present invention to provide an improved bird training device that includes a tape playback unit and operating means that have desirable mechanical features.

BRIEF DESCRIPTION OF THE INVENTION

Briefly, applicant's training device comprising a housing having a sound recording playback unit mounted therein, record means that is played by the unit and switch means to turn the unit on and off in response to the bird's weight on a perch. The bird is enticed and encouraged to sit on the perch since a full-size mirror is mounted on the side of the device adjacent the perch. When the bird sees his full reflection in the mirror, the excitement encourages the bird to perform. Particularly when the spoken words are reproduced through the playback unit, the bird is likely to mimic the bird of the reflection and begin to repeat the phrases recorded on the record means.

Openings are provided in the mirror for the sounds to emanate in the position substantially in the location of the head of the bird in the reflection. This further encourages the bird on the perch to talk and compete with his reflection that seems real to him.

A strip latch is provided to lock the switch means in either the "on" or "off" position as may be desired. Two notches are provided to perform this function. As will be realized, this allows the owner to either deactivate the sound unit, such as in the evening, or to activate the unit even when the bird is not on the perch for a concentrated training session.

The record means preferably comprises a magnetic tape band extending around the full periphery of the unit for maximum length. The tape head is spring biased into engagement with the backup pad of the playback unit so that the tape may be properly threaded. A spring of lesser strength than the spring urging the tape head is employed on one of the guide means in order to maintain controlled tension in the tape.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
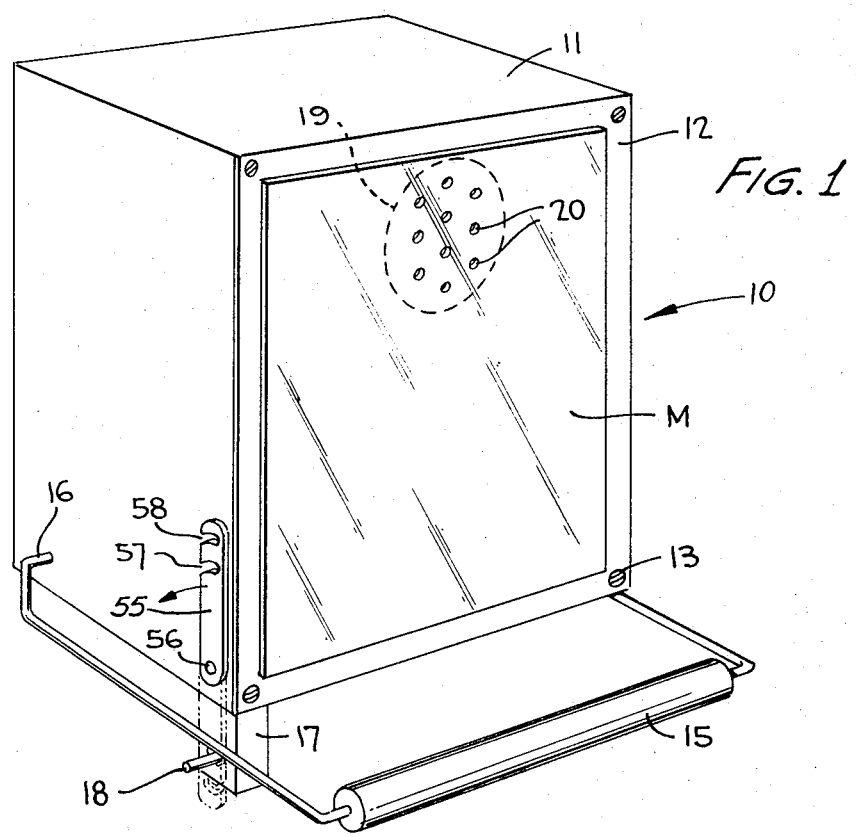
FIG. 1 is a perspective view of a training device constructed in accordance with the teachings of the present invention.

With reference now to FIG. 1, there is shown a training device 10 that is constructed in accordance with the principles of the present invention. The device 10 includes a suitable housing 11 having a front side panel 12 having full-size mirror M that may be removable to expose the inside components and for changing of the record, as will be more clearly evident below. The front panel 12 may be held in place by a suitable number of screws 13, as shown in FIG. 1.

The device includes a perch 15 that is generally U-shaped and mounted for pivotal movement adjacent the rear of the device on the extensions 16 (only one shown in FIG. 1). One side of the perch is, in accordance with the principles of the invention, operative to cooperate with a microswitch 17 positioned along the bottom of the device. A lever 18 projecting from the microswitch 17 forms the interconnecting means of the two parts. As will thus be clear, when a bird flies up and alights on the perch 15, said perch is depressed and the lever 18 is pivoted in the downward direction to the dotted line position as shown in FIG. 1. This switching action in the switch 17 activates the tape playback unit (discussed below) and causes sounds to emanate from a speaker 19 positioned directly behind the front panel 12, as shown in FIG. 1. As the bird is sitting on the perch, it will be noted he sees substantially his full reflection and the speaker 19 is substantially at the height of the bird's head, as he would be sitting on the perch 15. This is of importance as will now be explained More specifically, the mirror M, which is substantially the full size of the front panel 12 and at least as large as the bird that would be capable of sitting on the perch 15, encourages the bird to talk to what he believes is another full size bird of his own kind. Since the speaker 19 is in the position of the real bird's head, it appears to him that the reflected bird is speaking from the area of its head, and thus total life-like simulation is given to provide still further encouragement to the bird. A plurality of openings 20 may be provided in the panel 12 and the mirror M in order to provide fuller transmission of the sound in the direction of the bird.

Figure 2:
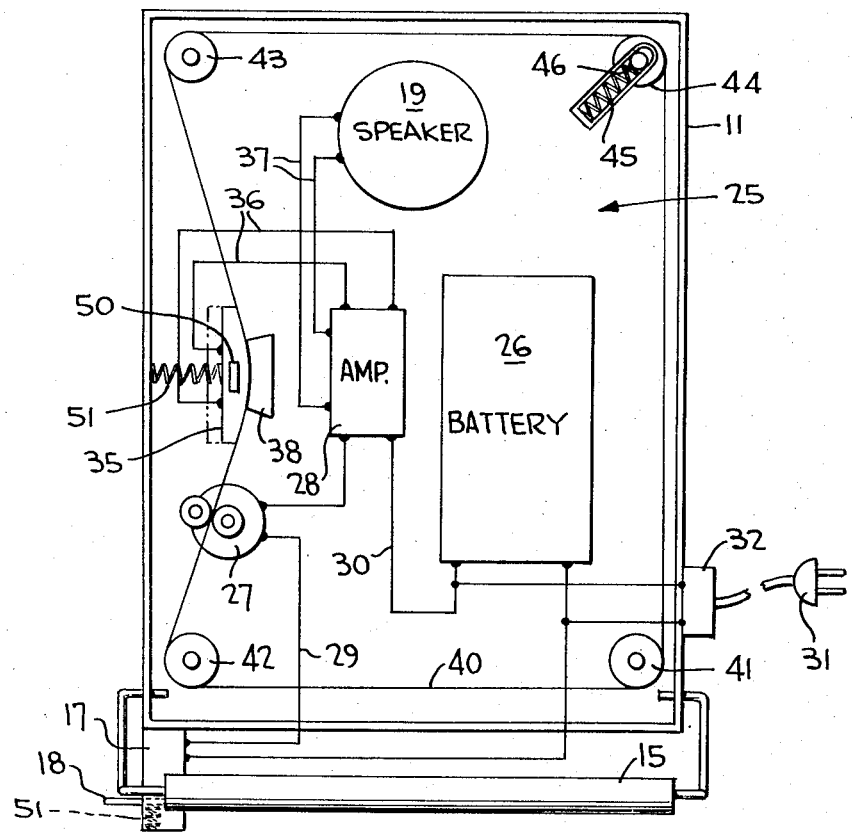
FIG. 2 is a view of the device with the front panel removed showing in block diagram form the components of the tape playback unit.

In FIG. 2, there is shown a view of the device 10 with the front panel 12 removed and so as to reveal tape playback unit 25. This unit includes a suitable battery 26, a drive motor 27 and an amplifier 28. The drive motor 27 and amplifier 28 are interconnected through lines 29, 30 via the switch 17 that thus turns these components on and off. An alternate source of power may be transformer 31 having a plug 32 that may be plugged into a conventional 110 volt a.c. outlet.

A tape pickup head 35 is provided and is connected to the amplifier 28 through a pair of leads 36. Sound transmission leads 37 complete the circuit to the speaker 19. A backup pad 38 is provided in conjunction with the tape head 35.

The record means is provided in the form of an endless ban 40 of magnetic tape and this band is guided around the full periphery of the housing 11 by guide rollers 41-44. At least one of the guide rollers, such as the guide roller 44, can be spring mounted adjacent its ends by a spring 45 in order to urge the axle of the roller outward along a guide track 46. This outward urging of the roller 44 assures constant tension in the tape band 40.

The tape head may include a knob 50 to allow engagement with the finger of an operator in order to bring the head 35 back to the dotted line position for loading of the band 40. A spring 51 is utilized to constantly urge the tape head 35 against the backup pad 38 in order to assure constant playing pressure. The strength of the spring 51 is greater than the spring 45 so that the tape head is not pulled away from the pad 38. In other words, the spring 51 dominates so that the roller 44 will assume a floating condition and maintain constant tension in the tape 40. Since the tape runs along the full periphery of the housing 11, a maximum time of spoken words can be placed on the tape 40 without complicated mechanisms for providing additional loops in the tape band 40.

As mentioned above, the lever 18 controls the switch 17, and thus starts and stops the the tape playback unit 25. The lever 18 is pivoted upwardly by a spring 51 which thus in turn supports the weight of the perch 15. The spring 51 is calibrated so that the weight of the bird on the perch 15 moves the lever so as to switch the switch 17 from the "off" position to the "on" position.

In order to provide a simple manner of overriding the control action of the perch 15 on the lever 18, there is provided strip latch 55 pivotally mounted on a suitable screw or pin 56. This strip latch has a first notch or aperture 57 closest to the pivot 56 and a second notch or aperture 58 spaced further from the pivot 56. As can be seen in FIG. 1, the strip latch 55 can be rotated to the dotted line position to catch the lever 18 in the "off" position, and thus lock the same in this position. The strip latch 55 is sufficiently resilient to extend out over the side support of the perch 15, and to assist in this manner in holding the perch 15 steady in this locked position. The friction of the engagement of the two parts, serves at the same time to hold the latch 55 in position against inadvertent release. When the lever 18 and the perch 15 are so locked, the bird cannot activate the tape unit 25. This locking feature can be used at night, or any other time, when the owner does not wish to be disturbed by the device 10. If the perch 15 is held in the depressed or down position while the latch strip 55 is rotated, the notch 58 will catch the lever 18 and lock the switch in the "on" position. The latch 55 has sufficient stiffness to hold the lever 18 down against the action of the spring 51. This mode can be used by the owner when a concentrated course is desired to be given to the bird, since the tape unit 25 will operate continuously regardless of whether the bird is on the perch 15 or not.

In view of the foregoing, it is believed that it will now be clear to those skilled in the art that an improved bird training device has been disclosed that is highly efficient in teaching a bird to talk. The mirror M is full size to encourage the bird, and the positioning of the speaker 19 also assists in the encouragement. The tape unit 25 is of a simple design, but has important features that make it efficient in this application. The record means is in the form of a tape band 40 that extends around the full periphery of the housing 11 and is kept under tension by a spring 45. The tape head 35 can be released against the action of the spring 51, that is of greater strength than the spring 45. The latch strip 55 is effective to lock the unit in either the "on" or "off" mode as desired by the operator.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. A training device to teach a bird to talk comprising a housing, a sound recording playback unit mounted in said housing, record means having spoken sounds recorded thereon for reproduction by said playback unit, said record means including a magnetic tape formed into an endless band having the spoken sounds recorded thereon for repetition, guiding means positioned adjacent the outer periphery of said housing for carrying said band in an endless path so that said band may be of maximum length, switch means for activating said unit, perch means for the bird mounted on said housing for movement in response to the bird's weight thereon, and means for interconnecting said switch means and said perch whereby to cause switching to the "on" position for activation of said playback unit when the bird is on the perch and playing of the spoken sounds so as to teach the bird to talk.

2. The training device of claim 1 wherein said playback unit includes a tape head and backup pad, said tape head being resiliently mounted for manual retraction to allow loading of said band and at least one of said guiding means being resiliently mounted, the resilient mounting force of said head being greater than said guiding means to assure maintenance of tape head and backup pad engagement as well as tension in said band.

3. A training device to teach a bird to talk comprising a housing, a sound recording playback unit mounted in said housing, record means having spoken sounds recorded thereon for reproduction by said playback unit, switch means for activating said unit, said switch means being provided with means for holding said switch in a selected "on" or "off" position, said holding means including strip latch means movably mounted on said housing adjacent said switch means and notch means in said strip, perch means for the bird mounted on said housing for movement in response to the bird's weight thereon, means for interconnecting said switch means and said perch whereby to cause switching to the "on" position for activation of said playback unit when the bird is on the perch and playing of the spoken sounds so as to teach the bird to talk, said interconnecting means including a lever on said switch, and said notch means being adapted to be placed over said lever to thereby override the action of said perch.

4. The training device of claim 3, wherein is provided a spring on said switch to resiliently urge said lever upwardly to the "off" position, said strip means having sufficient stiffness to hold said lever to the "on" position against the action of said spring.

5. The training device of claim 4 wherein said strip means is pivotably mounted to allow for movement between the operative position engaging said lever and the inoperative position, said strip means overlying said perch in the operative position to hold the same steady.

6. A training device to teach a bird to talk comprising a housing, a sound recording playback unit mounted in said housing, endless record means mounted on said device and and having spoken sounds recorded thereon for reproduction and repetition by said playback unit, switch means, power drive means mounted on said device for activating said unit in response to said switch means, perch means for the bird mounted on said housing for movement in response to the bird's weight thereon, and means for interconnecting said switch means and said perch whereby to cause switching to the "on" position for activation of said playback unit when the bird is on the perch and playing of the spoken sounds so as to teach the bird to talk, a mirror on the side of the housing adjacent the perch to attract the bird, said mirror having sufficient size to reveal substantially a full sized reflection to encourage the bird to talk, said playback unit including a speaker mounted directly behind said mirror to give the illusion that the reflected bird in the mirror is talking to further encourage the bird on the perch to talk, wherein is provided openings in said mirror in front of said speaker to allow fuller transmittal of said sounds, said openings being positioned at the head location of the reflected bird.

7. The training device of claim 6 wherein is provided means for holding said switch in a selected "on" or "off" position.

* * * * *